US007620845B2

United States Patent
Endo

(10) Patent No.: US 7,620,845 B2
(45) Date of Patent: Nov. 17, 2009

(54) DISTRIBUTED SYSTEM AND REDUNDANCY CONTROL METHOD

(75) Inventor: Kotaro Endo, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 632 days.

(21) Appl. No.: 11/069,973

(22) Filed: Mar. 3, 2005

(65) Prior Publication Data

US 2005/0204184 A1    Sep. 15, 2005

(30) Foreign Application Priority Data

Mar. 12, 2004    (JP)    ............................... 2004-071494

(51) Int. Cl.
*G06F 11/00*    (2006.01)
(52) U.S. Cl. ........................................................ 714/12
(58) Field of Classification Search ..................... 714/12
See application file for complete search history.

(56) References Cited

U.S. PATENT DOCUMENTS

| | | | | | |
|---|---|---|---|---|---|
| 4,733,353 | A | * | 3/1988 | Jaswa | 713/375 |
| 5,239,641 | A | * | 8/1993 | Horst | 713/375 |
| 5,278,975 | A | * | 1/1994 | Ishihata et al. | 713/375 |
| 5,353,436 | A | * | 10/1994 | Horst | 713/375 |
| 5,384,906 | A | * | 1/1995 | Horst | 713/375 |
| 5,884,018 | A |   | 3/1999 | Jardine et al. | |
| 5,903,717 | A | * | 5/1999 | Wardrop | 714/12 |
| 6,202,067 | B1 | * | 3/2001 | Blood et al. | 707/10 |
| 6,470,462 | B1 | * | 10/2002 | Karlsson et al. | 714/11 |
| 6,490,693 | B1 | * | 12/2002 | Briskey et al. | 714/15 |
| 6,542,929 | B1 |   | 4/2003 | Briskey et al. | |
| 6,772,303 | B2 | * | 8/2004 | Crockett et al. | 711/162 |
| 2002/0194276 | A1 |   | 12/2002 | Endo | |

FOREIGN PATENT DOCUMENTS

| | | |
|---|---|---|
| EP | 0 965 922 A2 | 12/1999 |
| EP | 1 107 119 A2 | 6/2001 |
| EP | 1 274 012 A2 | 1/2003 |
| EP | 0 965 922 A3 | 3/2003 |
| EP | 1 107 119 A3 | 7/2005 |
| EP | 1 274 012 A3 | 7/2005 |
| JP | 2001-117895 | 4/2001 |
| JP | 2003-67215 | 3/2003 |

OTHER PUBLICATIONS

European Search Report issued on Sep. 6, 2006, for European Application No. 5005136.6.

* cited by examiner

*Primary Examiner*—Robert Beausoliel
*Assistant Examiner*—Amine Riad
(74) *Attorney, Agent, or Firm*—Finnegan, Henderson, Farabow, Garrett & Dunner, L.L.P.

(57) ABSTRACT

A distributed system using a quorum redundancy method in which a redundancy process is executed by at least Q processing elements of N processing elements communicable with each other, each of N processing elements includes a resynchronization determining unit for determining that an execution state of the processing element itself can be resynchronized with a latest execution state in the distributed system in the case where the processing element can communicate with at least F+1 elements (F=N−Q) already synchronized of the N processing elements at the time of rebooting the processing element, and a resynchronizing unit for resynchronizing the execution state of the processing element itself to the latest one of the execution states of the at least F+1 processing elements in accordance with the result of determination by the resynchronizing unit.

12 Claims, 4 Drawing Sheets

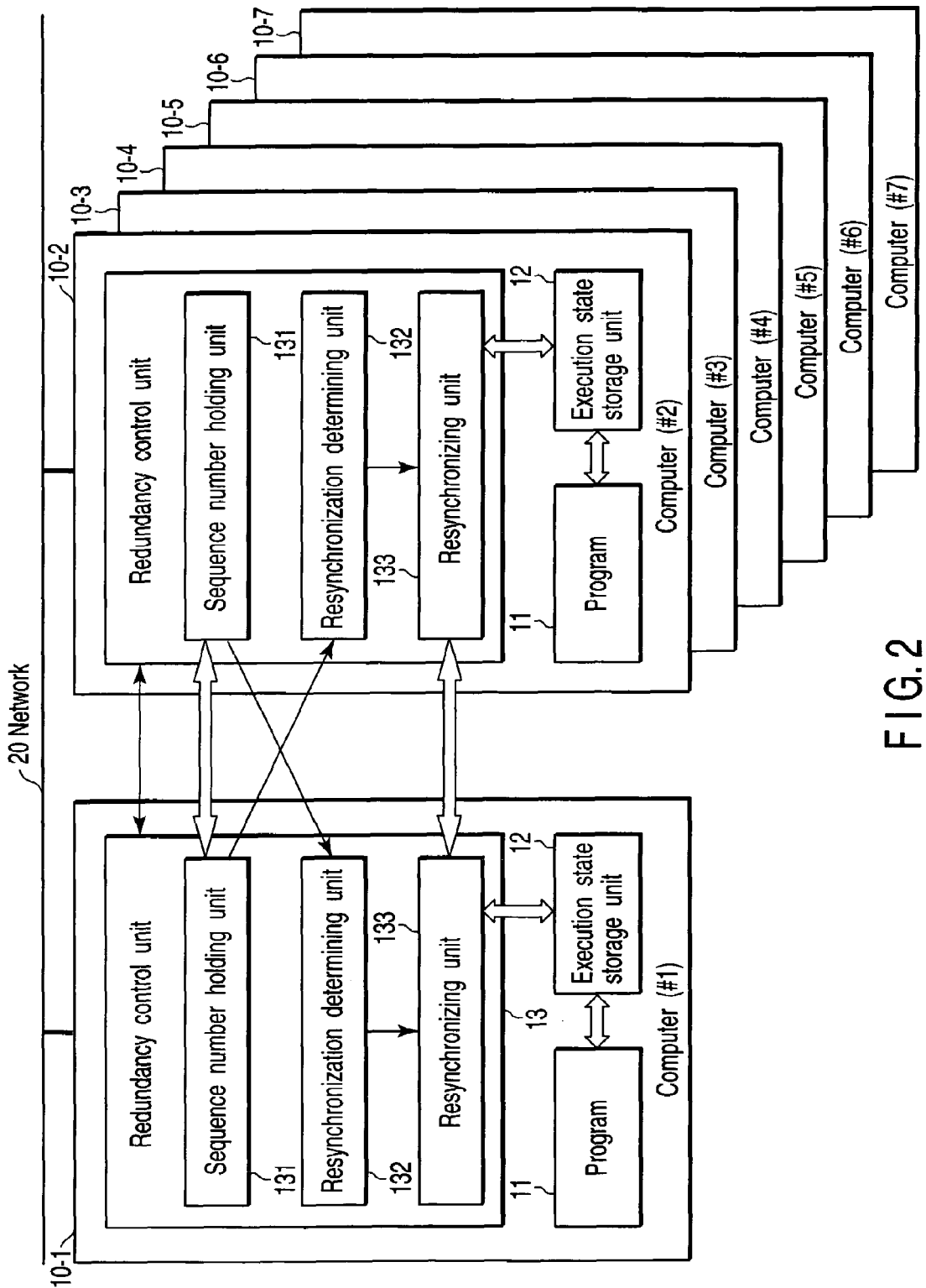
F I G. 2

DISTRIBUTED SYSTEM AND REDUNDANCY CONTROL METHOD

CROSS-REFERENCE TO RELATED APPLICATIONS

This application is based upon and claims the benefit of priority from prior Japanese Patent Application No. 2004-071494, filed Mar. 12, 2004, the entire contents of which are incorporated herein by reference.

BACKGROUND OF THE INVENTION

1. Field of the Invention

The present invention relates to a distributed system and a redundancy control method in which the process is redundant by N (where N is an integer 4 or more) processing elements which are typically computers connected by a network and able to communicate with each other.

2. Description of the Related Art

In recent years, computer technologies and network technologies have been improved so remarkably that business computerization has spread widely. For some businesses, however, long suspension due to a computer fault is not allowed. Generally, therefore, a distributed system has recently been constructed to connect a plurality of computers by a network. A distributed system configured of a plurality of mutually communicable processing elements (process execution units) operated concurrently on a single computer is also known. These processing elements are included in a known process of mutual communication carried out by an operating system (OS) to transmit and receive messages or packets through a common interface. Now, an explanation is made about a distributed system with a plurality of computers connected by a network.

The redundant computer processing is known as one of the methods of operating a distributed system. In the distributed system, each computer may make a fault independently. In the case where the whole system fails due to a fault of a single computer, the availability of the system is reduced below that of a single computer. To prevent such an inconvenience, the process of the whole system is required to be redundant. By redundancy process of the whole system, the availability of the distributed system can be increased beyond that of a single computer. For example, consider a distributed system configured of ten computers, each of which is operating at the availability of 99%. Assuming there is no redundancy at all, then the availability of the whole system is about 90%. On the other hand, provided that multi-point-failure of up to three computers can be tolerated by redundancy, the availability of the whole system become about 99.9998%.

[Fail-Over Method]

In the distributed system, a method of the redundancy process of computer is conventionally known in which the particular process is transferred to another computer upon computer fault detection. This method is known as a fail-over method.

In the fail-over method, a computer fault is generally detected by periodical communication between the computers to check the mutual operating conditions. This communication is called the "heart beat". The stop failure of the computer is detected by the time-out of the heart beat. In other words, a computer failing to send out the heart beat for a preconfigured time interval is considered to be stopped.

In a distributed system using the fail-over method, a split brain poses a problem. The split brain is defined as the fact that an execution context (state) is partitioned into two or more. The split brain occurs when a fault is detected erroneously. In the case where two groups of computers making up a distributed system come to fail to communicate with each other (networking partitioning), for example, the two computer groups detect the fault of each other. In this case, each of the two computer groups starts the operation independently, and therefore a split brain occurs. In another case, the transmission of the heart beat of a given computer is temporarily suspended due to an abnormally heavy load and a fault is detected. Even in the case where the computer resumes the operation subsequently, a split brain may continue.

The redundant process is generally an important one in a distributed system. Once a split brain occurs, therefore, the process comes to lack consistency thereby giving a fatal effect on the system as a whole.

[Majority Voting Method]

A method using the Majority voting (Majority voting method) is known to basically solve the problem of the split brain in the fail-over method. In this method, the same process is executed by all redundant computers, and in the case where the operation of the computers representing a majority of the whole can be shared (synchronized) with each other, the process is continued regardless of the operation of the remaining computers. This method can avoid the split brain basically.

Assume, for example, that the process is redundant (tripled) by three computers X, Y, Z, the network of which is partitioned into a group A of two computers X, Y and a group B of one computer Z. Even in this case, group A continues the process. The process of group B, on the other hand, is suspended. The suspension is defined as the state in which the process cannot be continued until the number of computers of which the operation can be shared with each other reaches a majority.

Assuming that computer Z has hung under an abnormally heavy load. The process of the computer group (group A) representing the remaining majority of computers is continued regardless of computer Z. After restoration of computer Z, the process of computer Z which fails to constitute a majority is not executed arbitrarily. In other words, computer Z resumes the operation after being resynchronized with the process of the computer group representing a majority.

[Quorum Algorithm]

The Majority voting method described above constitutes one of the Quorum algorithms. In the Quorum algorithm, all the redundant computers execute the same process, and once the operation of the computers representing the quorum come to be shared with each other, the process is continued regardless of the operation of the remaining computers. Jpn. Pat. Appln. KOKAI Publication Nos. 2001-117895 (paragraphs 0007, 0018 to 0022, FIGS. 1 to 5) and 2003-67215 (paragraphs 0056 to 0064, FIG. 4) disclose a distributed system using the Quorum algorithm. An example of the Majority voting method having a quorum representing one half of the whole (i.e. the number is more than one half) is disclosed in Jpn. Pat. Appln. KOKAI Publication No. 2001-117895. In Jpn. Pat. Appln. KOKAI Publication No. 2001-117895, a distributed system is disclosed in which in the case where the number of servers (computers) representing a majority (i.e. the number constituting a quorum group) is N, the number N can be dynamically changed as far as the servers representing the quorum (majority) of N are in operation. Jpn. Pat. Appln. KOKAI Publication No. 2003-67215, on the other hand, discloses a ⅔ quorum algorithm in which the quorum is a minimum integer representing more than ⅔ of the whole. The ⅔ quorum algorithm is considered a redundancy method having a higher redundancy.

As described above, the Quorum algorithm, unlike the fail-over method, can basically avoid the split brain. The Quorum algorithm, however, poses another problem not encountered by the fail-over method. This problem is explained below.

Consider the case that a plurality of computers make faults, i.e. simultaneous multi-point-failure occur in a distributed system. In the fail-over method, the process can be continued as long as one computer is in operation. In the Quorum algorithm, on the other hand, the process can be continued if and only if quorum of computers are in operation. Once the number of computers in operation is less than the quorum, the processes on the operating computers cannot proceed. In such a case, the system is generally stopped.

But, there is another approach. Instead of the system being stopped in the case where the number of computers in operation is reduced to less than the quorum, the process may be suspended temporarily at the particular time point, and when some of faulty computers are recovered and rebooted, they may be resynchronized with the process of the remaining computers thereby to resume the process automatically. However, there was a technical problem of preventing the generation of a split brain on time axis when employing this method. The split brain on time axis is defined as the type of split brain which is developed as a mismatch between the external input/output process in the case where a redundancy process is repeated from a given time point and executed again.

The split brain on time axis is explained with reference to a distributed system using the ⅔ quorum decision algorithm of the redundancy process with seven computers #1 to #7 shown in FIG. 1. In this case, the quorum is 5. First, at time point T1 when computers #1 to #7 complete processes P1, P2, P3, assume that communication fails between including the two computers #1 and #2 and the five computers #3 to #7. In other words, the network is partitioned into computer group A including the two computers #1 and #2 and computer group B including the five computers #3 to #7.

In this case, computers #3 to #7 of the group B satisfying the quorum continue the process. Computers #1 and #2 of group A not satisfying the quorum, on the other hand, suspend the process. Assume that a multi-point-failure involving all the computers #3 to #7 of group B occurs at a time point T2 when the five computers #3 to #7 complete processes P4, P5, P6 following process P3. Also assume that computers #3 to #7 of group B are rebooted and the network partitioning is eliminated at time point T3.

Rebooted computers #3 to #7 of group B are resynchronized with computers #1 and #2 of group A. The process of computers #1 and #2 of group A is in suspension at time point T1, i.e. at the end of process P3. The seven computers #1 to #7, therefore, resume process P3 at time point T3 from the end of execution of the process. As a result, computers #3 to #7 execute the process once more from time point T1 to T2. In view of the fact that the process resumed from time point T3 involves the input/output of signals from/to an external source, however, a mismatch, i.e. a split brain on time axis may occur between processes P4', P5', P6' following process P3 resumed from time point T3 and processes P4, P5, P6 executed from time points T1 to T2.

BRIEF SUMMARY OF THE INVENTION

According to an aspect of the present invention, there is provided a distributed system using a quorum redundancy method in which a redundancy process is executed by at least Q (Q: quorum) processing elements of N (N: an integer 4 or more) processing elements communicable with each other, only in the case where the operations of the at least Q processing elements can be synchronized with each other, each of N processing elements comprises a resynchronization determining unit configured to determine that an execution state of the processing element itself can be resynchronized with a latest execution state in the distributed system in the case where the processing element can communicate with at least F+1 elements (F=N−Q) already synchronized of the N processing elements at the time of rebooting the processing element; and a resynchronizing unit configured to resynchronize the execution state of the processing element itself to the latest one of the execution states of the at least F+1 processing elements in accordance with the result of determination by the resynchronizing unit.

According to an another aspect of the present invention, there is provided a redundancy control method of the redundancy process in a distributed system using a quorum redundancy method in which a redundancy process is executed by at least Q (Q: quorum) processing elements of N (N: an integer 4 or more) processing elements communicable with each other, only in the case where the operations of the at least Q processing elements can be synchronized with each other, the method comprises determining whether a rebooted processing element can communicate with at least F+1 processing elements (F=N−Q) already synchronized of the N processing elements; detecting a processing element holding the latest execution state in the distributed system from the at least F+1 processing elements, in the case where the rebooted processing element can communicate with the at least F+1 processing elements; and resynchronizing the execution state of the rebooted processing element to the execution state of the detected processing element.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing a configuration of a distributed system according to an embodiment of the invention;

DETAILED DESCRIPTION OF THE INVENTION

Figure 1:
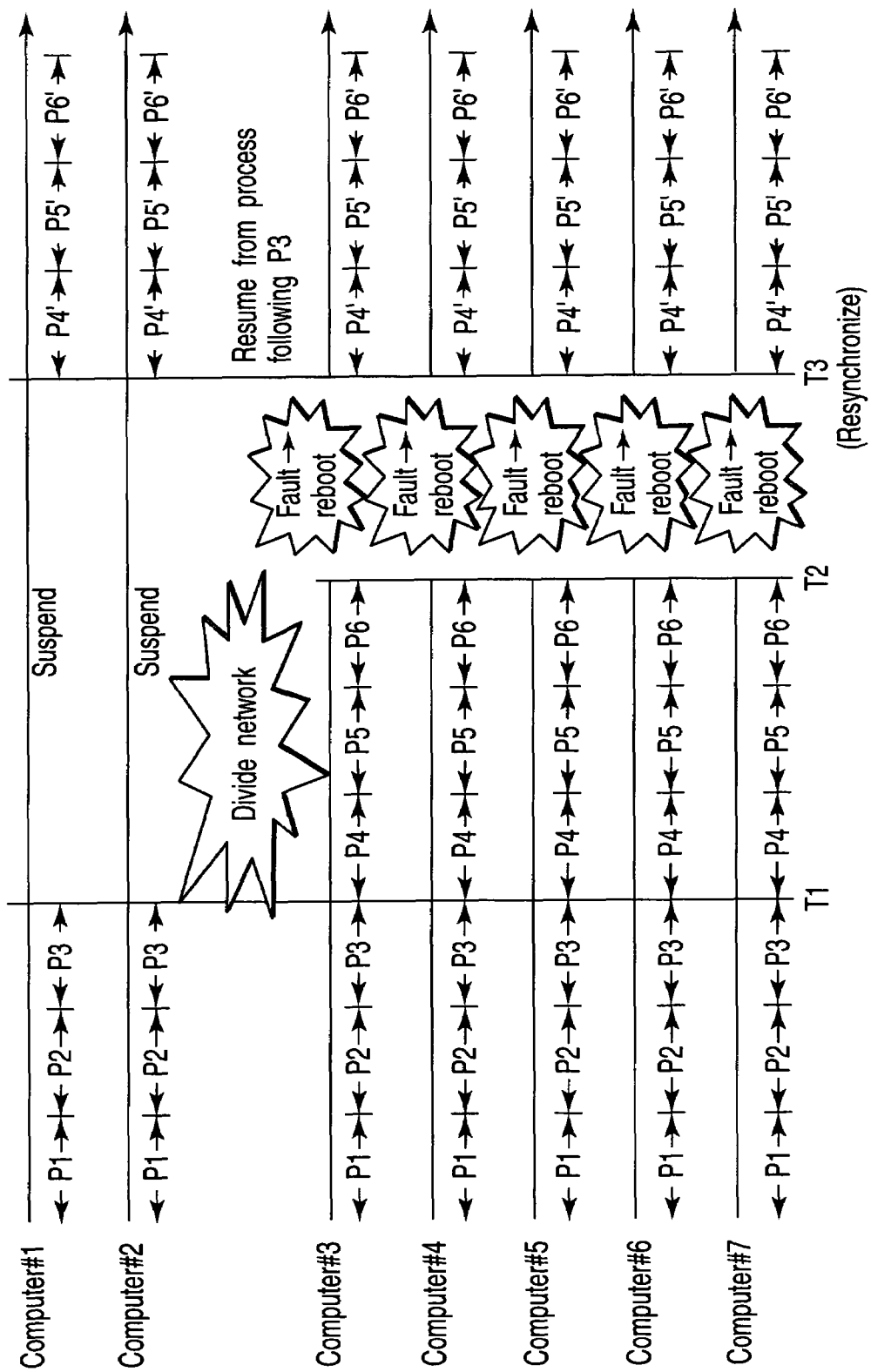
FIG. 1 is a sequence chart showing the processing conditions of each computer in the case where a split brain occurs on time axis by unconditional execution of the resynchronization process at the time of rebooting.

An embodiments of the invention is described below with reference to the drawings.

FIG. 2 is a block diagram showing a configuration of a distributed system according to an embodiment of the invention. The distributed system shown in FIG. 2 is configured of N (N: an integer 4 or more) or 7 computers 10-1 (#1) to 10-7 (#7). The computers 10-1 to 10-7 are processing elements communicable with each other. The computers 10-1 to 10-7 are interconnected by a network 20 and configured to be communicable with each other through the network 20.

In the distributed system shown in FIG. 2, the process is redundant by the seven computers 10-1 to 10-7. Also, the distributed system shown in FIG. 2 employs the conventional Quorum algorithm to control the redundancy operation. The feature of the distributed system of FIG. 2 employing the Quorum algorithm is explained. First, the number of the computers of which the process is redundant is indicated by N. According to this embodiment, N=7. Also, the quorum is indicated by Q. As well known, in the Quorum algorithm having the quorum of Q with the process of N redundant computers, assume that the operation of at least Q computers can be shared (synchronized) with each other (i.e. in the case where the Q computers makes up the same group). Only in that case, the process can be continued in spite of a fault which may be developed by any one of the other computers. In the case where the ⅔ quorum decision algorithm is employed as a Quorum algorithm, for example, Q is a minimum integer more than ⅔ and 5 in the case where N=7. Also, the value N−Q is indicated by F. As apparent, F is the maximum number of computers that continue the redundancy process in the whole system even in case of multi-point-failure. In the case where the ⅔ quorum decision algorithm is employed as a Quorum algorithm for N=7, Q=5 and therefore F=2.

The feature of this embodiment lies in the conditions and the method by which a given computer #i is recovered from a fault (malfunction), rebooted and resynchronized with the operation of the remaining computers. According to this embodiment, the resynchronization is defined as the process in which the latest state of the process held by any one or a plurality of the remaining computers already started at the particular time point is copied into the computer #i as the latest state of the process of its own. The resynchronization is executed no matter how many computer hold the latest state of the process. The condition required for resynchronization according to this embodiment is that, when a computer #i is rebooted, there exist at least F+1 computers which is capable of forming the same group with the computer #i, that is to say, communicable with the computer #i.

The resynchronization process unique to this embodiment described above can prevent a split brain on time axis for the reason described below. In the distributed system according to this embodiment employing the Quorum algorithm, the redundancy process is continued in the case where at least Q computers are grouped with each other without fail. The latest state of process in the distributed system, therefore, is held by at least Q computers. Assuming that the number of computers holding the latest state of process is the minimum Q, the number of computers not holding the latest state of process is equal to the number of the remaining computers, i.e. F=N−Q. In the case where the number of computers holding the latest state of process is more than Q, on the other hand, the number of computers not holding the latest state of process is less than N−Q, i.e. less than F. This indicates that at least one of arbitrary F+1 computers in the system holds the latest state of process. In the case where the computer #i is resynchronized under the resynchronization conditions described above, therefore, the computer #1 is always in the latest state of process (execution) as viewed from the system as a whole. Therefore, no split brain is caused on time axis.

Next, a specific mechanism of resynchronization is explained with reference to FIG. 2. The computers 10-1 (#1) to 10-7 (#7) each include a program 11 describing the steps of the process made redundant by the particular computers 10-1 to 10-7, an execution state storage unit 12 for holding the execution state (state of process) at the current time point in the computers 10-1 to 10-7, and a redundancy control unit 13 for controlling the redundancy process (redundancy with the quorum) in accordance with the program 11. For the convenience of illustration, however, the program 11, the execution state storage unit 12 and the redundancy control unit 13 are not shown in the computers 10-3 to 10-7 in FIG. 2. Also, in each computer 10-$i$ (i: 1 to 7) shown in FIG. 2, the storage unit providing the storage area to store the program 11 and the storage area to implement the execution state storage unit 12 are not shown.

The redundancy control unit 13 in each computer 10-$i$ is implemented by the computer 10-$i$ loading and executing a specific software program installed in the particular computer 10-$i$. This program can be distributed by being stored beforehand in a computer-readable storage medium such as a magnetic disk including a floppy (registered trade name) disk, an optical disk including a CD-ROM or a DVD, or a semiconductor memory including a flash memory. Also, the program may be distributed by being downloaded through a network. The redundancy control unit 13 includes a sequence number holding unit 131, a resynchronization determining unit 132 and a resynchronizing unit 133.

The sequence number holding unit 131 is used to hold the sequence number as progress information constituting an indicator of the progress of the process in the computer 10-$i$. The contents of the sequence number holding unit 131 are incremented by one, for example, each time the execution of the program 11 makes a progress on, or each time the stored state in the execution state storage unit 12 is updated.

The resynchronization determining unit 132 determines whether the computer 10-$i$, if rebooted, can be resynchronized to the process of a computer holding the latest execution state in the system. The resynchronizing unit 133 resynchronizes the computer 10-$i$ in accordance with the result of determination in the resynchronization determining unit 132. The resynchronizing unit 133 resynchronizes the computer 10-$i$ by updating the contents of the execution state storage unit 12 in the computer 10-$i$ to the latest execution state. The computer holding the latest execution state in the system can be detected by comparing the sequence numbers held in the sequence number holding unit 131 of the computers (the computers under redundancy control described later) already synchronized and communicable with the computer 10-$i$.

Next, the operation of the system shown in FIG. 2 is explained with reference to the flowcharts of FIGS. 3 and 4 and the sequence chart of FIG. 5.

First, the redundancy control is explained. The redundancy control units 13 in the computers 10-$i$ (i: 1 to 7) exchanges information with each other through a network 20 (step S1). This information exchange enables the redundancy control unit 13 in each computer 10-$i$ to determine whether the operation of at least Q computers including the particular computer 10-$i$ can be shared (synchronized) with each other (step S2). In the case of Jpn. Pat. Appln. KOKAI Publication No. 2003-

67215 (paragraphs 0056 to 0064, FIG. 4), for example, the input for the process Pj is exchanged between the computers, and it is determined whether the particular input can be shared by at least Q computers. The fact that the input for the process Pj can be shared by at least Q computers is equivalent to the fact that the operation of at least Q computers including the particular computer 10-$i$ can be shared with each other.

In the case where the operation of at least Q computers including the computer 10-$i$ can be shared with each other (step S2), the redundancy control unit 13 in the computer 10-$i$ creates a group constituted of the at least Q computers and proceeds to step S3. In step S3, the redundancy control unit 13 in the computer 10-$i$ executes, of all the processes described in the program 11, the process Pj corresponding to the current execution state held in the execution state storage unit 12. Upon complete execution of the process Pj, the redundancy control unit 13 updates the execution state held in the execution state storage unit 12 to the state in which the execution of the process Pj is completed (step S4). Also, the redundancy control unit 13 increments the sequence number held in the sequence number holding unit 131 by one (step S5). The redundancy control unit 13 repeats the process of steps S1 to S5.

In the case where the operation of Q computers including the computer 10-$i$ cannot be shared with each other (step S2), on the other hand, the redundancy control unit 13 in the computer 10-$i$ suspends the execution of the process of the program 11. In this case, the redundancy control unit 13 repeats the information exchange with the remaining computers at step S1 and the determination process at step S2 until the operation of at least Q computers come to be shared with each other. This repetitive operation at steps S1 and S2 by the redundancy control unit 13 of the computer 10-$i$ is also a part of the redundancy control operation. Specifically, as long as the process of steps S1 and S2 is repeated, the computer 10-$i$ continues to execute the redundancy control operation in accordance with the flowchart of FIG. 3 although a new process of the program 11 is not executed by the computer 10-$i$. Once the operation of the Q computers including the computer 10-$i$ come to be shared with each other, the computer 10-$i$ can immediately proceed to a new process (step S3) in synchronism with the operation of the other computers executing the process of the program 11.

Figure 5:
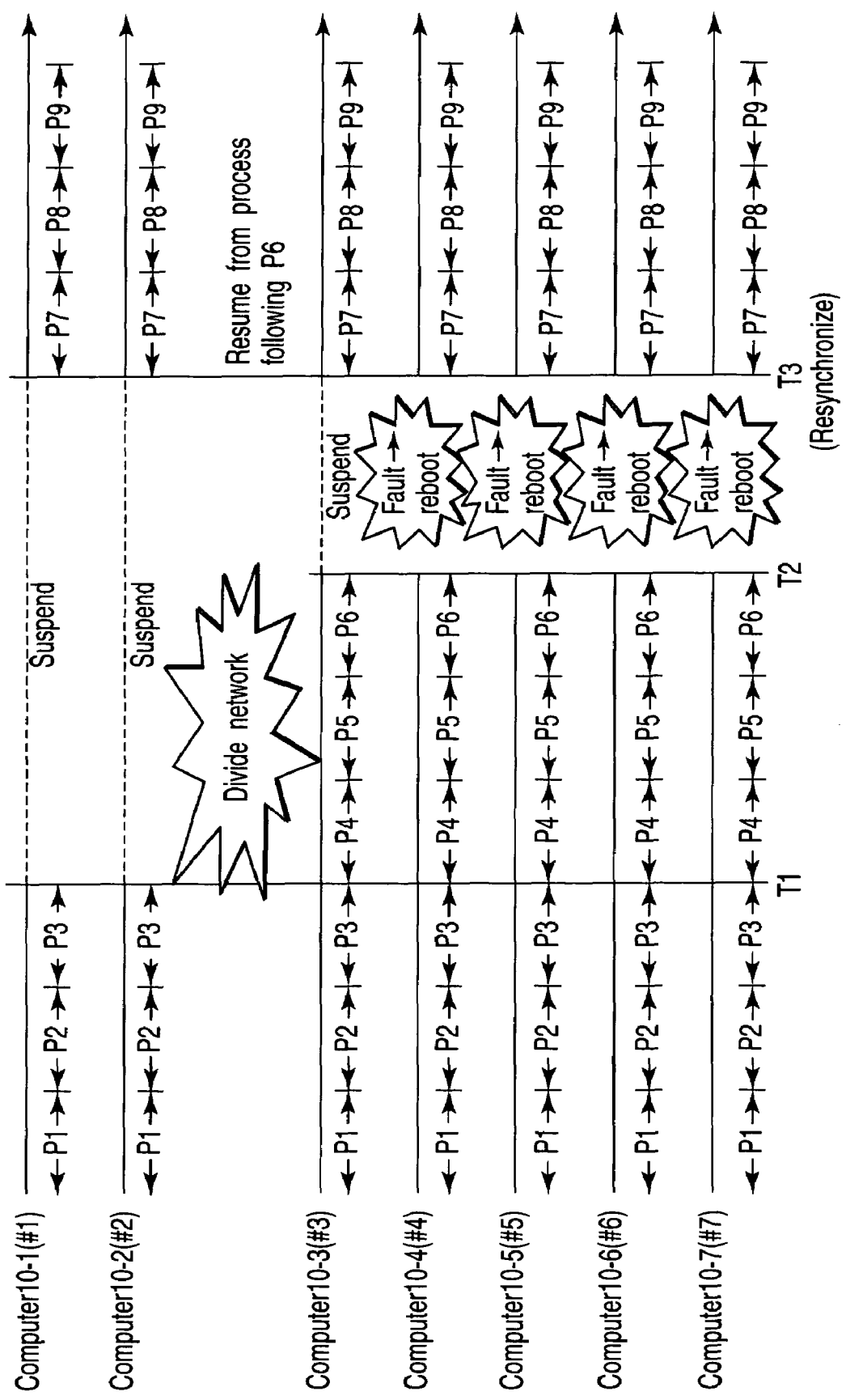
FIG. 5 is a sequence chart showing the processing conditions of each computer according to the same embodiment.

Now, assume that the processes P1, P2, P3 of the program 11 are executed as shown in FIG. 5 in all the computers 10-1 to 10-7 in the system. At time point T1 when the process P3 is completed, assume that communication of two computers 10-1 (#1), 10-2 (#2) with five computers 10-3 (#3) to 10-7 (#7) fails. In other words, assume that computer group A including two computers 10-1 (#1), 10-2 (#2) and computer group B including five computers 10-3 (#3) to 10-7 (#7) are separated into two network partitions. In the case where the system in FIG. 2 employs the ⅔ quorum decision algorithm as a Quorum algorithm, N=7, Q=5 and F=2.

In this case, computer group B is configured of five computers 10-3 to 10-7, and therefore satisfies the ⅔ quorum Q. Computers 10-3 to 10-7, therefore, as shown in FIG. 5, continue process of the program 11 following process P3. Computers 10-1, 10-2 of computer group A, on the other hand, fail to satisfy Q (=5), and therefore as shown in FIG. 5, suspend process of the program 11 without proceeding to process following process P3.

After that, at time point T2 upon completion of processes P4, P5, P6 following process P3 by computers 10-3 to 10-7, assume that four computers 10-4 to 10-7, for example, of computers 10-3 to 10-7 make faults and eventually stop. Even in the case where the division of computer 10-3 from computers 10-1, 10-2 by network partitioning is canceled and comes to share the operation with computers 10-1, 10-2, i.e. computer 10-3 comes to form same group with computers 10-1, 10-2, the ⅔ quorum is not satisfied, and therefore, the process is suspended.

Now, assume that the fault of computers 10-4 to 10-7 is temporary and computers 10-4 to 10-7 are recovered from the fault and rebooted. The redundancy control units 13 in computers 10-4 to 10-7 start reboot process in accordance with the flowchart of FIG. 4.

First, the redundancy control unit 13 in computer 10-$j$ (j: 4 to 7) communicates with the other computers in the system (step S11). The resynchronization determining unit 132 of the redundancy control unit 13 in computer 10-$j$, as the result of communication at step S1, determines whether communication is possible with F+1 or more computers (i.e. at least F+1 computers) executing the redundancy control operation (already synchronized) (step S12). In the case where there exist F+1 or more computers which can communicate with computer 10-$j$ and which are executing the redundancy control operation, the resynchronization determining unit 132 determines that computer 10-$j$ can be resynchronized. In this case, the resynchronization determining unit 132 passes the control operation to the resynchronizing unit 133 in same computer 10-$j$.

According to this embodiment (Q=5) in which the system shown in FIG. 2 is configured of seven computers 10-1 to 10-7 (N=7) and uses the ⅔ quorum decision algorithm as a Quorum algorithm, F+1=(N−Q)+1=(7−5)+1=3. As described above, in the case where there exist F+1 (=3) or more computers executing the redundancy control operation, at least one of the F+1 (=3) computers holds the latest execution state (process state). In the case of the sequence chart shown in FIG. 5, the number of computers executing the redundancy control operation at time point T3 is F+1 (=3) of computers 10-1 to 10-3. In this case, at least one of the F+1 (=3) computers 10-1 to 10-3 holds the latest execution state (the state in which the execution of the process P6 is completed).

The resynchronizing unit 133 in computer 10-$j$ (j: 4 to 7) detects a computer holding the latest execution state, and executes the process for resynchronizing computer 10-$j$ to the particular computer holding the latest execution state, in the manner described below. First, from the F+1 or more computers (in this case, F+1=3, i.e. three computers 10-1 to 10-3) communicable with computer 10-$j$ and executing the redundancy control operation, computer 10-$j$ acquires the sequence numbers held by the sequence number holding units 131 of the F+1 or more computers (step S13). The sequence numbers can be acquired by the resynchronizing unit 133 in computer 10-$j$, for example, requesting the F+1 or more computers to transfer the sequence numbers.

The resynchronizing unit 133 in computer 10-$j$, by comparing the sequence numbers acquired from the F+1 or more computers, determines the latest sequence number (in this case, the sequence number of the largest value) (step S14). Of all the computers executing the redundancy control operation, the computer holding the latest sequence number (herein-after referred to as the computer 10-$k$) is computer 10-3 included in computers 10-1 to 10-3 in the sequence chart shown in FIG. 5. The resynchronizing unit 133 identifies this computer 10-$k$ having the latest sequence number and resynchronizes computer 10-$j$ to the current execution state of the identified computer 10-$k$ (step S15). In the case of FIG. 5, computer 10-$k$ is computer 10-3, and therefore computer 10-$j$ (j: 4 to 7), i.e. computers 10-4 to 10-7 are resynchronized with computer 10-3. This resynchronization is carried out by the resynchronizing unit 133 which copies the contents (latest execution state) of the execution state storage unit 12 of computer 10-$k$ (the computer holding the latest sequence number) to the execution state storage unit 12 of computer 10-$j$. In this resynchronization process, the latest sequence number is also copied to the sequence number holding unit 131 of computer 10-$j$. In the case where the latest sequence number determined at step S14 is held also in the sequence number holding unit 131 of computer 10-$j$, the copy operation described above can be omitted considering that the resynchronization is complete.

Figure 3:
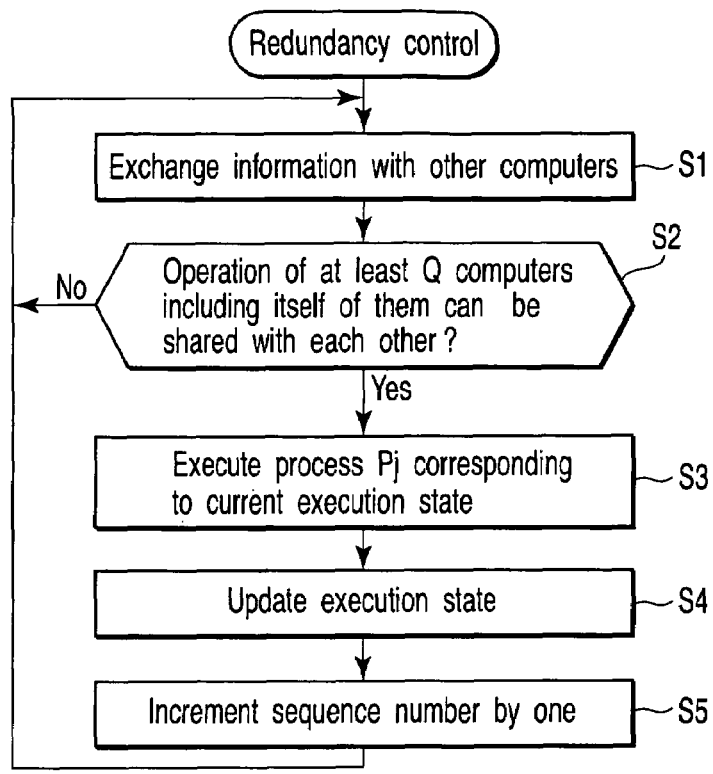
FIG. 3 is a flowchart showing the steps of redundancy control operation according to the same embodiment.
Figure 4:
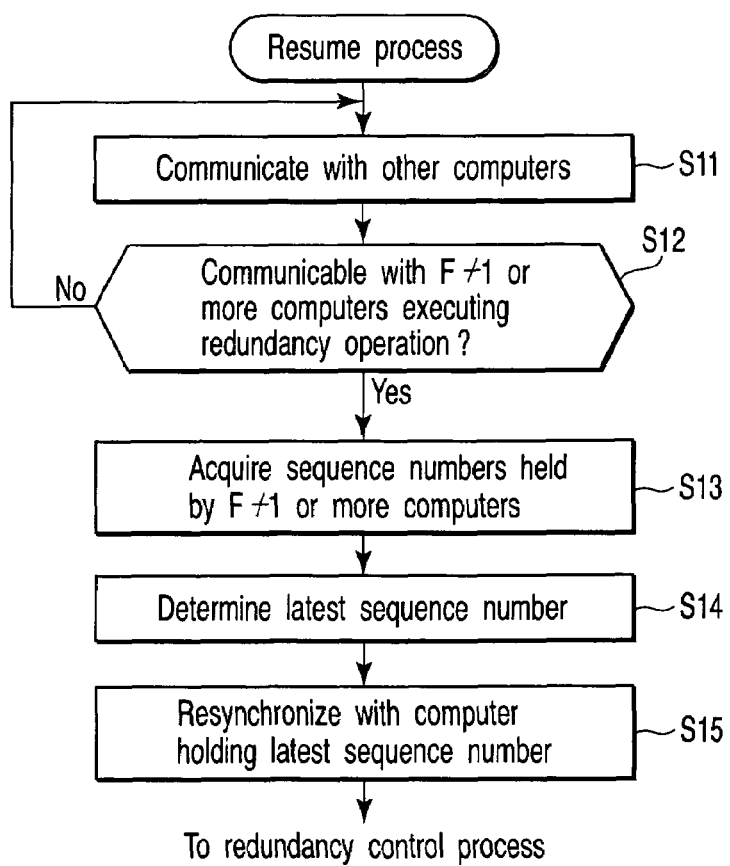
FIG. 4 is a flowchart showing the steps of the rebooting process including the resynchronization according to the same embodiment.

Computer 10-$j$ ($j$: 4 to 7), upon complete resynchronization to computer 10-$k$ (10-3), starts the redundancy control operation in accordance with the flowchart shown in FIG. 3. As a result, the redundancy control unit 13 of computer 10-$j$, as soon as the operation of the Q computers including itself come to be shared with each other, executes the following process based on the latest execution state held in the execution state storage unit 12. In the case of FIG. 5, computer 10-$k$, i.e. computer 10-3 has already completed the process up to P6 at time point T2 when computers 10-4 to 10-7 make faults. After that, assume that computers 10-4 to 10-7 are rebooted and communication of computers 10-1 to 10-3 becomes possible with computers 10-4 to 10-7, with the result that computers 10-4 to 10-7 can be resynchronized with computer 10-3 at time point T3 as shown in FIG. 5. In this case, the execution state of computers 10-4 to 10-7 is equal to the same latest execution state as that of computer 10-3. Also, computers 10-1, 10-2 are also in the same latest execution state as computer 10-3 due to the redundancy control operation. As a result, computers 10-1 to 10-7 start the redundancy operation from process P7 following process P6 at time point T3, and therefore no split brain on time axis occurs.

The effects of the embodiment described above are briefly summarized below.

First, this embodiment employs the Quorum algorithm (⅔ quorum decision algorithm) in which the process (redundancy operation) is continued in the case where the operation of at least Q (Q=5) out of the N (N=7) computers making up the distributed system can be shared with each other. In this case, if F (F=N−Q=2) or less computers make faults, like in the prior art described in Jpn. Pat. Appln. KOKAI Publication No. 2003-67215 (paragraphs 0056 to 0064, FIG. 5), the redundancy operation is not suspended even temporarily. In the case where F+1 or more but not more than Q−1 computers make faults, on the other hand, the system is not shut down, and as long as some of the faulty computers are rebooted and Q or more computers come to be operated in total, then the process, even though temporarily suspended, can be resumed automatically. According to this embodiment in which N=7, Q=5 and F=2, therefore, even in the case where the computers in the number of 3 (F+1=3) exceeding F to 4 (Q−1=4) make faults, the process can be automatically resumed. Take as an example that four computers make faults. As long as two of them are rebooted, the process can be automatically resumed by resynchronization with the process of the remaining three F+1 computers. This automatic rebooting of the process by resynchronization is impossible in the conventionally known Quorum algorithm in which a split brain is liable to occur on time axis.

A transient hardware fault or a fault of software such as OS (operating system), not an irreparable nor permanent hardware fault, represents a major proportion of the computer faults. According to this embodiment, the resynchronization is carried out automatically at the time of restarting the computer, and therefore the system availability in the case of multi-point-failure can be remarkably improved.

The embodiment described above employs the ⅔ quorum decision algorithm as a Quorum algorithm. Nevertheless, this invention is also applicable to other Quorum algorithms such as the Majority voting method with equal effect. In the case where N is an odd number, however, F+1=Q, and therefore the application of the resynchronization process at the time of rebooting the system as in the embodiment described above is not effective, as explained below. First, in the case where F+1=Q, the condition for synchronization, i.e. the fact that the at least F+1 computers are executing the multiple control operation is nothing but the fact that at least Q computers are executing the redundancy control operation, and therefore the redundancy operation is not suspended even temporarily. In this case, the operation of the computer that has developed a fault can be shared with the operation of the computer having the latest execution state in the redundancy control operation in accordance with the flowchart of FIG. 3, and therefore, the resynchronization process at the time of rebooting according to this embodiment is not required. In the case where N is an even number, on the other hand, Q−F=2, i.e. F+1<Q, and therefore the resynchronization at the time of rebooting the system according to this embodiment is very effective. By the way, in the case where N=8, the Majority voting method has Q 5, F=3 and F+1=4, while Q=6, F=2 and F+1=3 in the ⅔ quorum decision algorithm.

The embodiments are described above with reference to a case in which the processing elements constituting the distributed system and communicable with each other are computers. Nevertheless, this invention is also applicable to the case in which the processing elements are redundant processes or redundant servers operated on the operating system of the computer with equal effect.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distributed system comprising N processing elements where N is an integer of 4 or more, the distributed system executing a redundancy process provided at least a quorum Q of the N processing elements are communicable with each other, at least one of the N processing elements comprising:

an execution state storage unit configured to store a latest execution state of the at least one processing element in a volatile memory;

a resynchronization determining unit configured to determine whether to resynchronize an execution state of the at least one processing element with a latest execution state of the distributed system upon rebooting the at least one processing element, the determination being to resynchronize provided the at least one processing element can communicate with at least F+1 of the N processing elements, where F+1>=2, F=N−Q, and F>=1; and a resynchronizing unit configured to resynchronize the execution state of the at least one processing element to the latest execution state of the distributed system in accordance with the determination of the resynchronizing determining unit by:

comparing sequence numbers for the at least F+1 processing elements to determine which of the at least F+1 processing elements has a highest sequence number, the processing element determined to have the highest sequence number storing the latest execution state of the distributed system, and copying the latest execution state from the processing element determined to have the highest sequence number.

2. The distributed system according to claim 1, wherein the at least one processing element further comprises a progress information storing unit configured to store progress information comprising an indicator of progress of the redundancy process in the at least one processing element.

3. The distributed system according to claim 2, wherein the progress information storing unit stores, as the progress information, the sequence number for the at least one processing element, and increments the sequence number by one each time the redundancy process executes an additional step.

4. The distributed system according to claim 1, wherein Q is the ⅔ quorum coincident with the minimum integer more than ⅔ of N.

5. A method implemented in a distributed system comprising N processing elements where N is an integer of 4 or more, the distributed system executing a redundancy process provided at least a quorum Q of the N processing elements are communicable with each other, the method causing at least one of the N processing elements to:

store a latest execution state of the at least one processing element in a volatile memory;

determine whether to resynchronize an execution state of the at least one processing element with a latest execution state of the distributed system upon rebooting the at least one processing element, the determination being to resynchronize provided the at least one processing element can communicate with at least F+1 of the N processing elements, where F+1>=2, F=N−Q, and F>=1; and resynchronize the execution state of the at least one processing element to the latest execution state of the distributed system in accordance with the determination of whether the processing element can be resynchronized by:

comparing sequence numbers for the at least F+1 processing elements to determine which of the at least F+1 processing elements has a highest sequence number, the processing element determined to have the highest sequence number storing the latest execution state of the distributed system, and copying the latest execution state from the processing element determined to have the highest sequence number.

6. A computer-readable medium storing instructions for implementing a method in a distributed system comprising N processing elements where N is an integer of 4 or more, the distributed system executing a redundancy process provided at least a quorum Q of the N processing elements are communicable with each other, the method causing at least one of the N processing elements to:

store a latest execution state of the at least one processing element in a volatile memory;

determine whether to resynchronize an execution state of the at least one processing element with a latest execution state of the distributed system upon rebooting the at least one processing element, the determination being to resynchronize provided the at least one processing element can communicate with at least F+1 of the N processing elements, where F+1>=2, F=N−Q, and F>=1; and resynchronize the execution state of the at least one processing element to the latest execution state of the distributed system in accordance with the determination of whether the processing element can be resynchronized by:

comparing sequence numbers for the at least F+1 processing elements to determine which of the at least F+1 processing elements has a highest sequence number, the processing element determined to have the highest sequence number storing the latest execution state of the distributed system, and copying the latest execution state from the processing element determined to have the highest sequence number.

7. The method according to claim 5, wherein the at least one processing element stores progress information comprising an indicator of progress of the redundancy process in the at least one processing element.

8. The method according to claim 7, wherein the at least one processing element stores the progress information as the sequence number for the at least one processing element, and increments the sequence number by one each time the redundancy process executes an additional step.

9. The method according to claim 5, wherein Q is the ⅔ quorum coincident with the minimum integer more than ⅔ of N.

10. The computer-readable medium according to claim 6, wherein the at least one processing element stores progress information comprising an indicator of progress of the redundancy process in the at least one processing element.

11. The computer-readable medium according to claim 10, wherein the at least one processing element stores the progress information as the sequence number for the at least one processing element, and increments the sequence number by one each time the redundancy process executes an additional step.

12. The computer-readable medium according to claim 6, wherein Q is the ⅔ quorum coincident with the minimum integer more than ⅔ of N.

* * * * *